(12) United States Patent
Yano

(10) Patent No.: US 6,275,579 B1
(45) Date of Patent: Aug. 14, 2001

(54) NETWORK NUMBER MANAGEMENT SYSTEM AND SWITCH

(75) Inventor: Toshiyuki Yano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/145,320

(22) Filed: Sep. 1, 1998

(30) Foreign Application Priority Data

Mar. 20, 1998 (JP) .................................................. 10-072765

(51) Int. Cl.[7] .............................. H04M 3/00; H04M 5/00
(52) U.S. Cl. ........................ 379/242; 379/207; 379/221; 379/356
(58) Field of Search .................................. 379/219, 220, 379/221, 902, 242, 207, 229, 356

(56) References Cited

U.S. PATENT DOCUMENTS

| | | | |
|---|---|---|---|
| 5,598,458 | * 1/1997 | Bales et al. | 379/59 |
| 5,689,555 | * 11/1997 | Sonnenberg | 379/220 |
| 5,748,742 | * 5/1998 | Tisdale et al. | 380/49 |
| 6,097,801 | * 8/2000 | Williams et al. | 379/207 |

FOREIGN PATENT DOCUMENTS

| | | |
|---|---|---|
| 1-115260 | 5/1989 | (JP) . |
| 5-14271 | 1/1993 | (JP) . |
| 8-293917 | 11/1996 | (JP) . |

OTHER PUBLICATIONS

J.J. Lichter (ed), Generic Switching and Signaling Requirements for Number Portability, Illinois Number Portability Workshop, Aug. 1, 1997.*

* cited by examiner

Primary Examiner—Fan Tsang
Assistant Examiner—Nora J Putt
(74) Attorney, Agent, or Firm—Helfgott & Karas, P.C.

(57) ABSTRACT

Disclosed is a network number management system constructed so as not to reduce the number of subscriber telephone numbers registrable in a switch even if any number of network numbers are registered in this switch. One local switch is registered with a telephone number of a specified terminal which consists of a telephone exchange number set to this switch itself and arbitrary numerals, and has a telephone number management table for registering information for indicating whether or not the specified terminal exists in an area within a coverage of this switch itself. When receiving a call setting request in which the telephone number of the specified terminal serves as a connection request telephone number, the telephone number management table is retrieved, and, if registered with information for indicating non-existence of the specified terminal, the call setting request is transferred towards a service control point (SCP). The SCP reads from a conversion database a network number corresponding to the connection request telephone number of this call setting request, and rewrites the connection request telephone number of the call setting request into a network number. This network number contains a number portability telephone exchange number of the other local switch, and hence this call setting request is transferred to the other local switch. A number portability telephone exchange number is set in the other local switch separately from the ordinary telephone exchange number.

6 Claims, 16 Drawing Sheets

FIG. 3

| SUBSCRIBER TELEPHONE NUMBER | EXISTENCE/NON-EXISTENCE |
|---|---|
| 2 5 7 1 3 5 1 4 | NON-EXISTENCE |
| ⋮ | ⋮ |

| NETWORK NUMBER |
|---|
| E 2 2 2 D 3 3 3 |
| ⋮ |

| SUBSCRIBER TELEPHONE NUMBER | NETWORK NUMBER |
|---|---|
| 2 5 7 1 3 5 1 4 | E 2 2 2 D 3 3 3 |

NETWORK NUMBER MANAGEMENT SYSTEM AND SWITCH

BACKGROUND OF THE INVENTION

1. Field of the Invention

The present invention relates to a network management system and a switch in such a case that a plurality of communications networks managed by different companies (common carriers) are so constructed as to be geometrically dispersed, more particularly, relates to a network management system and a switch capable of moving an user terminal among areas covered by the plurality of communication networks and capable of using the user terminal before and after the movement.

2. Related Background Art

In a mobile telephone business dealing with, e.g., a portable telephone and an automobile telephone, there is a case in that a communications network is constructed by an each company (a common carrier) in each area and a telephone service is provided. Such a geometrical division of the communications networks will be, it can be considered, increasingly promoted from now on into the future in terms of a world-wide trend of privatizing the telephone businesses and a request from the Antimonopoly Law.

If the common carrier of the communications network thus differs per area, however, a terminal making a subscription contact with a specific common carrier and allocated with a telephone number is in principle permitted to use the telephone number only in the area within a coverage of the communications network managed by the common carrier concerned. Therefore, the user, when requesting the use of the terminal in an area different from the area within the coverage of the above communications network, must make the subscription contact once again with a common carrier of the communications network covering this different area. As a result, this carrier allocates a new telephone number which is absolutely different from the telephone number used so far. This is attributed to the fact that the telephone number partially contains a unique number (switch identification number=telephone exchange number) per switch (another part of the telephone number excluding the telephone exchange number corresponds to a subscriber number unique to the terminal).

A way known as "roaming" in, e.g., the mobile telephone business has been generalized in order to obviate both troublesomeness in making the subscription contract with each common carrier and inconvenience for changing the telephone number. This way is that when the terminal of a subscriber (herein referred to as a subscriber "B") who makes a subscription contract with one common carrier (herein called a common carrier "X") and is thereby allocated with a telephone number (e.g., "25713514", "2571" of which is a telephone exchange number of a local switch of the common carrier "X") moves to an area within a coverage by the communications network of other common carrier (herein referred to as a common carrier "Y"), this terminal is provided automatically or manually with a network number (e.g., "28371553") defined as a telephone number effective in the communications network of the common carrier "Y". Further, when a call setting request occurs upon dialing the original telephone number "25713514", a call setting process with respect to the terminal of the subscriber "B" is executed by automatically converting the telephone number "25713514". In this call setting request into the network number "28371553" and automatically transferring this network number to the switch of the common carrier "Y".

With this system, it might be simply enough for a subscriber (herein called a subscriber "A") telephoning the subscriber "B" to recognize the original telephone number, and the subscriber "B" himself or herself has no necessity for knowing the network number. Thus, the apparent telephone number is invariable, and hence this telephone number may also be referred to as a "portable number". Further, a function of making the apparent telephone number invariable in this way may also be termed a "number portability function".

FIG. 15 is a schematic explanatory diagram showing a case where such a number portability function is actualized in an intelligent network. As illustrated in FIG. 15, when the subscriber "A" dials a telephone number "25713514" (step 71), a call setting request containing this telephone number "25713514" is transferred to a local switch 101 of the common carrier "X" from a local switch 100 of a switching network accepting the terminal of the subscriber A (step 72). This local switch 101 judges that the terminal "B" of the subscriber "B" does not exist in an area within a coverage by a communications network of the carrier "X", and transfers this call setting request, after adding a dedicated access code thereto, to an SSP (Service Switching Point, a higher-order switch than local switches of each common carrier) 102 (step 73). Thereupon, this SSP 102 transfers the call setting request to an SCP (Service Control Point) 103 on the basis of the access code (step 74).

A database of this SCP 103 is prepared with a correspondence table showing telephone numbers (portable numbers) and network numbers, and hence the SCP 103, after automatically converting the telephone number "25713514" in the call setting request into a network number "28371553" (step 75), transfers this call setting request to a local switch 104 of the common carrier "Y" via the SSP 102 (step 76).

The network number "28371553" allocated to the subscriber "B" is registered in the local switch 104 at the point of time when the terminal of the subscriber "B" moves, and it is therefore feasible to execute a process for establishing a call between this terminal and the terminal of the subscriber "A" by calling the terminal of the subscriber B based on the network number "28371553".

Further, FIG. 16 is a schematic explanatory diagram in the case where the number portability function is carried out by the switch itself. As in the case of FIG. 16, when the call setting request containing the telephone number "25713514" is transferred (S81, S82), the local switch 105 of the common carrier "X" judges that the terminal of the subscriber "B" does not exist in the area within the coverage by the common carrier "X". Since the switch 105 is prepared with the correspondence table showing the telephone numbers (portable numbers) and the network numbers, the call setting request is, after the telephone number "25713514" in the call setting request has been automatically converted into the network number "28371553" (step 83), transferred to the local switch 104 of the common carrier "Y" by use of a call forwarding function (step 84). The local switch 104 having received this call setting request is, as the case of FIG. 16, capable of executing the process for establishing the call between the terminal of the subscriber "B" and the terminal of the subscriber "A".

Now, in the ordinary dial telephone, only the numerals of 0–9 can be transmitted as dial signals to the switch. Further, in a push-phone, only the numerals of 0–9 and signals * and # can be transmitted as the dial signals. The signals * and # are used only within the switch to which the telephone is connected. Note that the processing is carried out based on the hexadecimal numbers (1–9 and A–F; i.e., a single character is expressed by a 4-bit binary value) within the switch.

Therefore, the prior art switch, when receiving the call setting request, as shown in FIG. 17, analyzes the numerals of the telephone number contained in the same request (after being converted based on the hexadecimal number) (S91) and, if the numerals are composed of only some of 1–9 and A (corresponding to "0" of a dial signal and a push signal), continues the processing. If numerals excluding 1–9 and A are contained, the switch judges that the received numerals are wrong, and finishes the processing (S92).

As a result, when actualizing the number portability function by use of the prior art switch, as the case of the ordinary telephone number, only the numerals of 1–9 and "A" can be used as the network number.

As described above, only ten kinds of numerals can be used both for the ordinary telephone number and network number, and hence there are only $10^4$ ways of permutation of the registrable subscriber numbers. Accordingly, the number of telephone numbers allocatable to the subscribers having made the subscription contracts with the common carrier "Y" becomes smaller as a larger number of network numbers are registered in the switch 104 of the common carrier "Y". For instance, in the examples shown in FIGS. 15 and 16, "28371553" allocated as the network number can not be allocated as a telephone number of other subscriber. Consequently, there arises a problem in which the apparent subscriber capacity decreases.

SUMMARY OF THE INVENTION

It is a primary object of the present invention, which was contrived to obviate the above problems inherent in the prior art, to provide a network number management system and a switch that are constructed so as not to, even if any number of network numbers are registered in a switch, reduce the number of subscriber telephone numbers registrable in this switch.

To accomplish this object, the present invention adopts the constructions which follow.

The first aspect of the invention is a network number management system in a telephone network including a plurality of switches, each of the switches covering its own service area, and a telephone number converting apparatus. Each of the switches is allocated with a first type of exchange number and a second type of exchange number which are peculiar to the switch includes a first table registering a telephone number allocated to a terminal, the telephone number consisting of a combination of the first type of exchange number and a subscriber number; a second table registering non-existence information indicating whether or not the terminal allocated with the telephone number registered in the first table exists in the service area of the switch; a third table registering a network number allocated to the terminal existing in the service area of the switch and having the telephone number registered in the first table of a different switch among the plurality of switches, the network number consisting of a combination of the second type of exchange number and a subscriber number; a non-existence judging unit, when there is a call setting request containing a connection requested telephone number registered in the first table of the switch, for judging whether or not the terminal allocated with the connection requested telephone number exists in the service area of the switch with reference to the second table; and a transferring unit, when the non-existence judging unit judges that the terminal does not exist in the service area of the switch, for transferring the call setting request to the telephone number converting apparatus. The telephone number converting apparatus includes a fourth table in which the telephone number registered in the first table of one of the switches corresponds to the network number registered in the third table of another switch with respect to a same terminal; a converting unit, when receiving the call setting request transferred from one of the switches, for referring to the fourth table and for converting the connection requested telephone number of the call setting request into a corresponding network number; and a transferring unit for transferring the call setting connection request containing the connection requested telephone number converted by the converting unit to a switch having a second type of exchange number contained in the connection requested telephone number after being converted.

With this construction, each switch has the second type of exchange number in addition to the first type of exchange number. Accordingly, it never happens that the network number registered in the third table becomes coincident with the telephone number registered in the second table. Hence, even when any number of network numbers are registered in the third table, the telephone number registered in the first table are not limited.

The second aspect of the invention is a network number management system in a telephone network including a plurality of switches, each of the switches covering its; own service area. Each of the switch allocated with a first type of exchange number and a second type of exchange number which are peculiar to the switch, and includes a first table registering a telephone number allocated to a terminal, the telephone number consisting of a combination of the first type of exchange number and a subscriber number; a second table registering non-existence information indicating whether or not the terminal allocated with the telephone number registered in the first table exists in the service area of the switch; a third table registering a network number allocated to a terminal existing in the service area of the switch and having the telephone number registered in the first table of a different switch among the plurality of switches, the network number consisting of a combination of the second type of exchange number and a subscriber number; a fourth table in which the telephone number registered in the first table of the switch corresponds to the network number registered in the third table of another switch with respect to a same terminal; a non-existence judging unit, when there is a call setting request containing a connection requested telephone number registered in the first table, for judging whether or not the terminal allocated with the connection requested telephone number exists in the service area of the switch with reference to the second table; a converting unit, when the judging unit judges that the terminal does not exist in the service area of the switch, for referring to the fourth table and for converting the connection requested telephone number of the call setting request into a corresponding network number; and a transferring unit, when the non-existence judging unit judges that the terminal does not exist in the service area of the switch, for transferring the call setting request to a switch having a second type of exchange number contained in the connection requested telephone number after being converted.

With this construction, each switch has the second type of exchange number in addition to the first type of exchange number. Accordingly, it never happens that the network number registered in the third table becomes coincident with the telephone number registered in the second table. Hence, even when any number of network numbers are registered in the third table, the telephone number registered in the first table are not limited.

The third aspect of the invention is a network number management system in a telephone network including a plurality of switches, each of the switches covering its own service area, and a telephone number converting apparatus. Each of the switches is allocated with an exchange number peculiar to the switch, and includes a first table registering a telephone number allocated to a terminal, the telephone number consisting of a combination of the exchange number and a subscriber number composed of only numerals of 1 through 9 and A based on a hexadecimal number; a second table registering non-existence information indicating whether or not the terminal allocated with the telephone number registered in the first table exists in the service area of the switch; a third table registering a network number allocated to the terminal existing in the service area of the switch and having the telephone number registered in the first table of a different switch among the plurality of switches, the network number consisting of a combination of the exchange number and a subscriber number containing one of numerals of B through F based on the hexadecimal number; a non-existence judging unit, when there is a call setting request containing a connection requested telephone number registered in the first table, for judging whether or not the terminal allocated with the connection requested telephone number exists in the service area of the switch with reference to the second table; and a transferring unit, when the non-existence judging unit judges that the terminal does not exist in the service area of the switch, for transferring the call setting request to the telephone number converting apparatus. The telephone number converting apparatus includes a fourth table in which the telephone number registered in the first table of one of the switches corresponds to the network number registered in the third table of another switch with respect to a same terminal; a converting unit, when receiving the call setting request transferred from one of the switches, for referring to the fourth table and for converting the connection requested telephone number of the call setting request into a corresponding network number; and a transferring unit for transferring the call setting connection request containing the connection requested telephone number converted by the converting unit to a switch having an exchange number contained in the connection requested telephone number after being converted.

With this construction, the subscriber number contained in the telephone number is composed of only the numerals of 1 through 9 and A based on the hexadecimal number, and the numerals of B through F based on the hexadecimal number are invariably included in a part or the whole of the subscriber number contained in the network number. Accordingly, it never happens that the network number registered in the third table becomes coincident with the telephone number registered in the second table. Hence, even when any number of network numbers are registered in the third table, the telephone number registered in the first table are not limited.

The fourth aspect of the invention is a network number management system in a telephone network comprising a plurality of switches, each of the switches covering its own service area. Each of the switches is allocated with an exchange number peculiar to the switch, and includes a first table registering a telephone number allocated to a terminal, the telephone number consisting of a combination of the exchange number and a subscriber number composed of numerals of 1 through 9 and A based on a hexadecimal number; a second table registering non-existence information indicating whether or not the terminal allocated with the telephone number registered in the first table exists in the service area of the switch; a third table registering a network number allocated to the terminal existing in the service area of the switch and having the telephone number registered in the first table of a different switch among the plurality of switches, the network number consisting of a combination of the exchange number and a subscriber number containing one of numerals of B through F based on the hexadecimal number; a fourth table in which the telephone number registered in the first table of the switch corresponds to the network number registered in the third table of another switch with respect to a same terminal; a non-existence judging unit, when there is a call setting request containing a connection requested telephone number registered in the first table, for judging whether or not the terminal allocated with the connection requested telephone number exists in the service area of the switch with reference to the second table; a converting unit, when the judging unit judges that the terminal does not exist in the service area of the switch, for referring to the fourth table and for converting the connection requested telephone number of the call setting request into a corresponding network number; and a transferring unit for transferring the call setting request containing the connection requested telephone number converted by the converting unit to a switch having an exchange number contained in the connection requested telephone number after being converted.

With this construction, the subscriber number contained in the telephone number is composed of only the numerals of 1 through 9 and A based on the hexadecimal number, and the numerals of B through F based on the hexadecimal number are invariably included in a part or the whole of the subscriber number contained in the network number. Accordingly, it never happens that the network number registered in the third table becomes coincident with the telephone number registered in the second table. Hence, even when any number of network numbers are registered in the third table, the telephone number registered in the first table are not limited.

According to a fifth aspect of the invention, in network number management system, the subscriber number contained in the telephone number registered in the first table includes only numerals of 1 through 9 and A based on a hexadecimal number, and the subscriber number contained in the network number registered in the third table includes one of numerals of B through F based on the hexadecimal number.

The sixth aspect of the invention is a switch allocated with a first type of exchange number and a second type of exchange number which are peculiar to the switch. The switch includes a first table registering a telephone number allocated to a terminal, the telephone number consisting of a combination of the first type of exchange number and a subscriber number; a second table registering non-existence information indicating whether or not the terminal allocated with the telephone number registered in the first table exists in a service area of the switch; a third table registering a network number allocated to the terminal existing in the service area of the switch and having the telephone number registered in the first table of a different switch, the network number consisting of a combination of the second type of exchange number and a subscriber number; a fourth table in which the telephone number registered in the first table of the switch corresponds to the network number registered in the third table of another switch with respect to a same terminal; a non-existence judging unit, when there is a call setting request containing a connection requested telephone number registered in the first table, for judging whether or not the terminal allocated with the connection requested telephone number exists in the service area of the switch with reference to the second table; a converting unit, when the non-existence judging unit judges that the terminal does not exist in the service area of the switch, for referring to the fourth table and for converting the connection requested telephone number of the call setting request into a corresponding network number; and a transferring unit for transferring the call setting connection request containing the connection requested telephone number converted by the converting unit to a switch having an exchange number contained in the connection requested telephone number after being converted.

With this construction, the switch has the second type of exchange number in addition to the first type of exchange number used for the telephone number. Accordingly, it never happens that the network number registered in the third table becomes coincident with the telephone number registered in the second table. Hence, even when any number of network numbers are registered in the third table, the telephone number registered in the first table are not limited.

The seventh aspect of the invention is a switch allocated with an exchange number peculiar to the switch. The switch comprises a first table registering a telephone number allocated to a terminal, the telephone number consisting of a combination of the exchange number and a subscriber number composed of numerals of 1 through 9 and A based on a hexadecimal number; a second table registering non-existence information indicating whether or not the terminal allocated with the telephone number registered in the first table exists in the service area of the switch; a third table registering a network number allocated to the terminal existing in the service area of the switch and having the telephone number registered in the first table of a different switch, the network number consisting of a combination of the exchange number and a subscriber number containing one of the numerals of B through F based on the hexadecimal number; a fourth table in which the telephone number registered in the first table of the switch corresponds to the network number registered in the third table of another switch with respect to a same terminal; a non-existence judging unit, when there is a call setting request containing a connection requested telephone number registered in the first table, for judging whether or not the terminal allocated with the connection requested telephone number exists in the service area of the switch with reference to the second table; a converting unit, when the judging unit judges that the terminal does not exist in the service area of the switch, for referring to the fourth table and for converting the connection requested telephone number of the call setting request into a corresponding network number; and a transferring unit for transferring the call setting request containing the connection requested telephone number converted by the converting unit, to a switch having an exchange number contained in the connection requested telephone number after being converted.

With this construction, the subscriber number contained in the telephone number is composed of only the numerals of 1 through 9 and A based on the hexadecimal number, and the numerals of B through F based on the hexadecimal number are invariably included in a part or the whole of the subscriber number contained in the network number. Accordingly, it never happens that the network number registered in the third table becomes coincident with the telephone number registered in the second table. Hence, even when any number of network numbers are registered in the third table, the telephone number registered in the first table are not limited.

These together with other objects and advantages which will be subsequently apparent, reside in the details of construction and operation as more fully hereinafter described and claimed, reference being had to the accompanying drawings forming apart hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 3 is a diagram showing a data structure of a telephone number management table in FIG. 2;

FIG. 4 is a diagram showing a data structure of a network number management table in FIG. 2;

FIG. 9 is a diagram showing a data structure of a conversion database in FIG. 8;

DESCRIPTION OF THE PREFERRED EMBODIMENTS

Embodiments of the present invention will hereinafter be described with reference to the accompanying drawings.

[Embodiment 1]

(Construction of Telephone Network)

Figure 1:
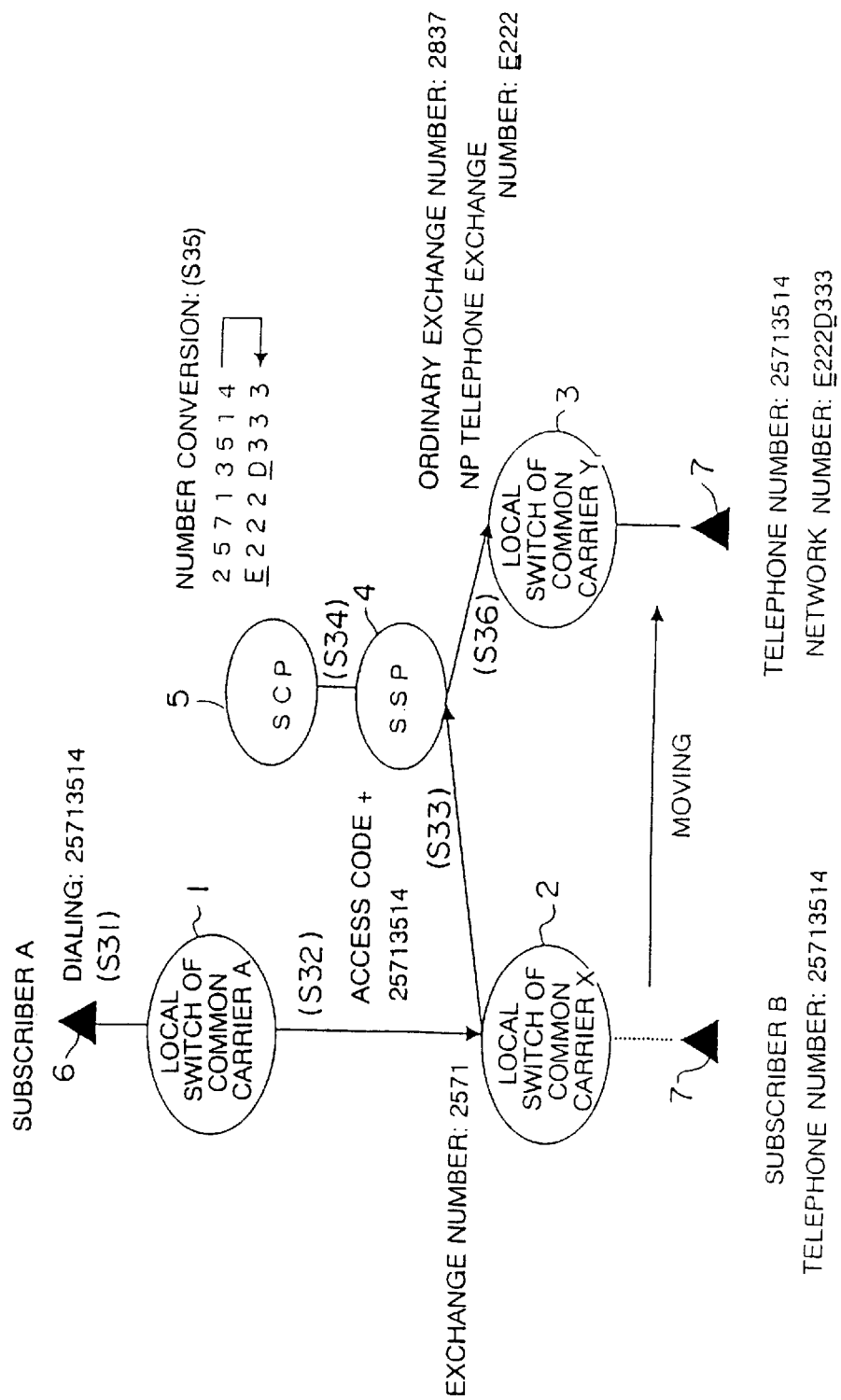
FIG. 1 is a diagram schematically showing a construction of a telephone network in a first embodiment of the present invention.

FIG. 1 is a conceptual diagram showing a construction of a telephone network structured by mutually connecting communication networks individually managed by different companies (common carriers). FIG. 1 exemplifies a state where the telephone network is constructed of a fixed communication network managed by a common carrier "A", a fixed communication network managed by a common carrier "X", and a fixed communication network managed by a common carrier "Y", etc. Note that local switches (a local switch 1 of the common carrier "A", a local switch 2 of the common carrier "B", and a local switch 3 of the common carrier "Y") for respectively controlling the telephone networks managed by the individual common carriers, are connected to each other through unillustrated relay lines. As a result, a speech can be made between a terminal accepted in any one of the local switches and a terminal accepted in other local switch.

It is to be noted that the local switches (the local switch 2 of the common carrier "B" and the local switch 3 of the common carrier "Y") for controlling the individual fixed communication networks, are further connected to an SSP (Service Switching Point) 4 defined as a switch managed by the third party. This SSP 4 is connected to an SCP (Service Control Point).

In the thus constructed telephone network, a terminal 6 of a subscriber "A" having made a subscription contract with the common carrier body "A", is connected to the local switch 1 of the common carrier "A". Further, it is assumed that a terminal 7 of a subscriber "B" having made a subscription contract with the common carrier "X" might have existed in a service area within a coverage by the local switch 2 of the common carrier "X", and thereafter moves to a service area within a coverage by the local switch 3 of the common carrier "Y". Incidentally, a telephone exchange number of the local switch 2 of the common carrier "X" is "2571". Further, a telephone exchange number of the local switch 3 of the common carrier "Y" is "2837". For carrying out a number portability function in the embodiment 1, this local switch 3 is prepared with a telephone exchange number (a 2-type telephone exchange number) for a number portability such as "E222" partially containing numerals "B"–"F" in addition to the normal telephone exchange number (a 1-type telephone exchange number) of "3827".

An individual explanation of each of the devices constituting the telephone network will be given hereinafter.

[Local Switch]

Figure 2:
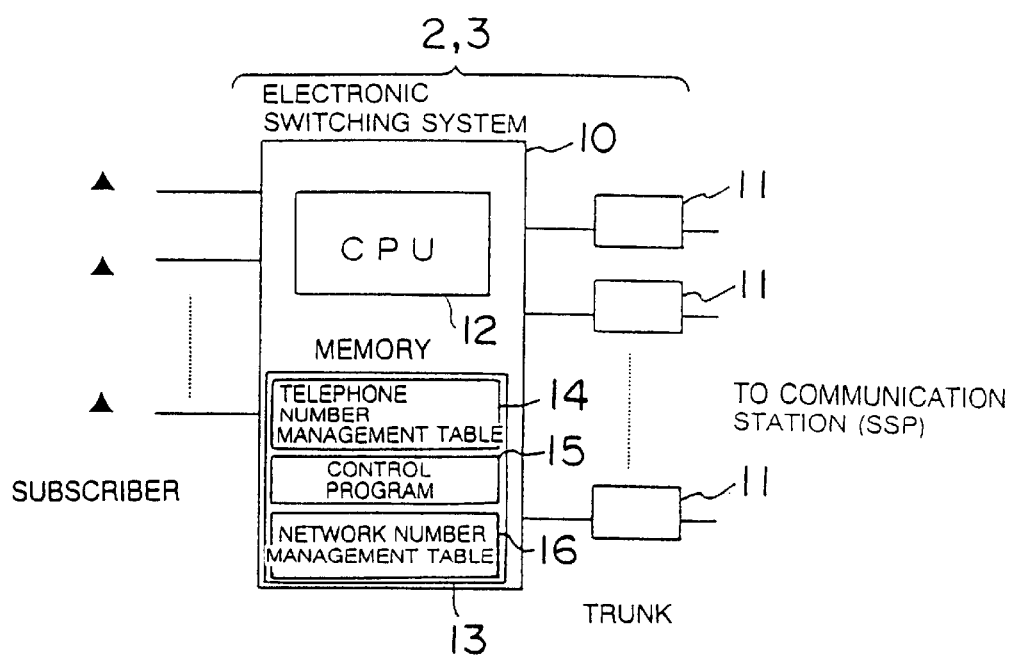
FIG. 2 is a block diagram showing a specific construction of each local switch in FIG. 1.

FIG. 2 is a block diagram showing a specific configuration of the local switches 2, 3. As illustrated in FIG. 2, each of the local switches 2, 3 is classified as a digital switch essentially consisting of an electronic switching system 10 connected to lines of a multiplicity of subscriber terminals, and of a multiplicity of trunks 11 connected to this electronic switching system 10. Each trunk 11 accepts relay lines connected to communications stations (such as the SSP 4 and other local switches 1, 2, 3). Further, the electronic switching system 10 is constructed of a CPU 12 and a memory 13.

This CPU 12 is a processor for executing a call setting control process and a switching control process. Further, the memory 13 is stored with a control program 15 for making the CPU 12 perform necessary operations by the program being executed by the CPU 12, and provides a working area (for, e.g., buffering data to be switched) for the control process by the CPU 1. Furthermore, the memory 13 is stored with a telephone number management table 14 and a network number table 15 in order to actualize a number portability function.

The telephone number management table 14 serving as a first table and a second table has, as shown in FIG. 3, a column (corresponding to the first table) showing the telephone numbers (telephone exchange numbers+subscriber numbers) allocated to the terminals of the subscribers having made the subscription contracts with the common communications carrier who manages the local switch concerned, and a column (corresponding to the second table) in which a flag (corresponding to non-existence information) is set for distinguishing whether or not the terminal allocated with the telephone number exists in the service area within the coverage by that local switch per telephone switch. FIG. 3 exemplifies the telephone number management table 14 stored in the local switch 2 of the common carrier "X", and hence a telephone number of "25713514" allocated to the terminal 7 of the subscriber B is registered as well as setting the flag indicating that the terminal 7 allocated with this telephone number does not exist.

Further, a network number table 15 serving as a third table, as shown in FIG. 4, shows network numbers (each network number=a number portability telephone exchange number+a subscriber number) allocated to terminals having moved to the service area within the coverage by that local switch. FIG. 4 exemplifies the network number table 15 stored in the local switch 3 of the common carrier "Y", and therefore a network number of "E222D333" allocated to the terminal 7 of the subscriber "B" is registered. Note that this network number is set to contain the numerals of "B"–"F" (hexadecimal numbers) in some or whole proportion of each of the telephone exchange number and the subscriber number.

Figure 5:
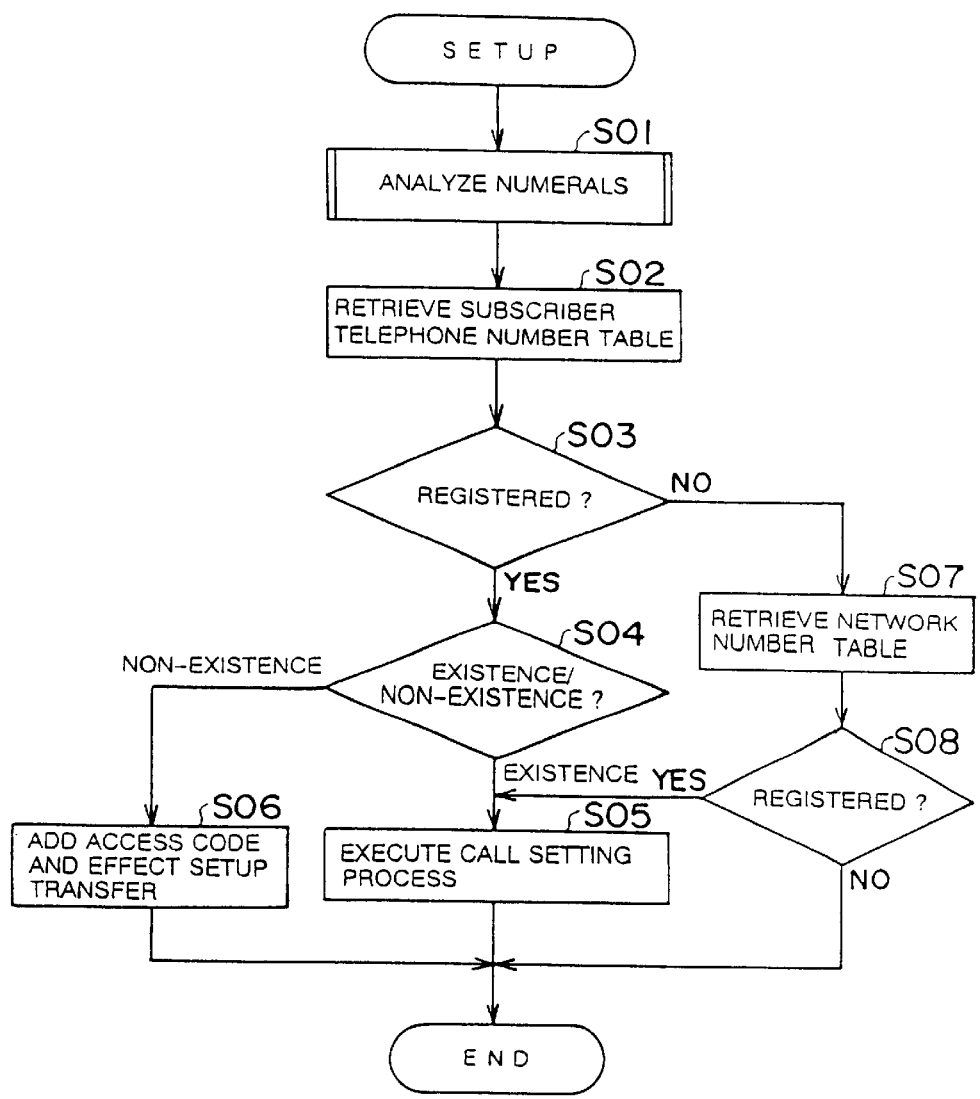
FIG. 5 is a flowchart showing a call setting process executed by a CPU in accordance with a control program in FIG. 2.

FIG. 5 is a flowchart showing a part (a call setting process) of the control program 15 to be executed by the CPU 12 by referring to the telephone number management table 14 and the network number table 15. This call setting process starts upon receiving a call setting request from the subscriber terminal existing in the service area within the coverage by that local switch or from the local switch of other common communications carrier.

Figure 6:
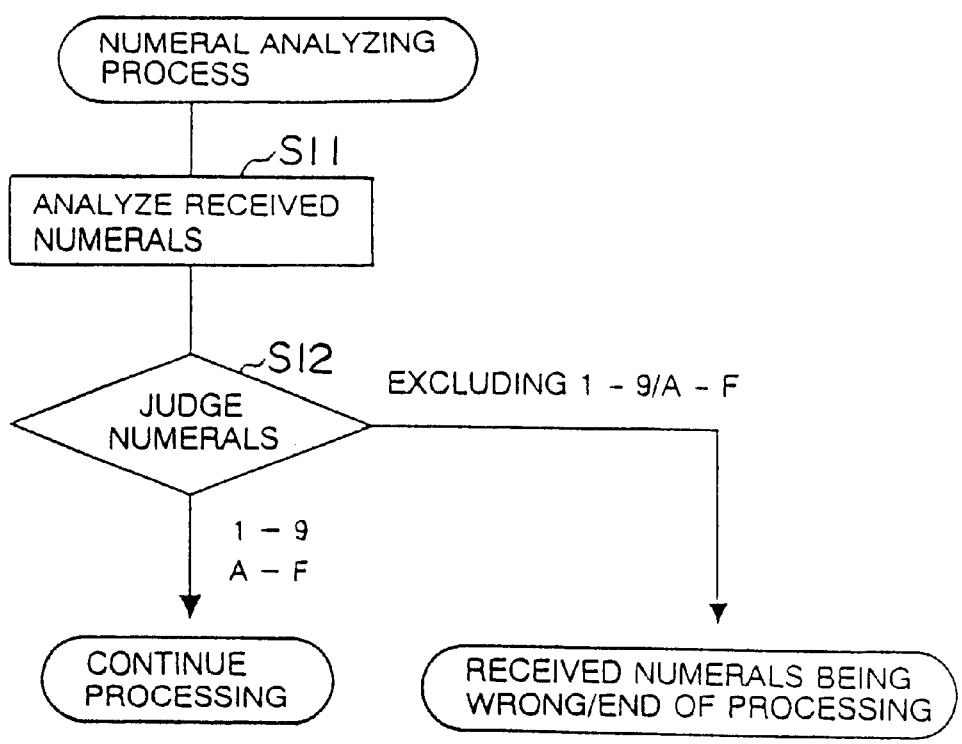
FIG. 6 is a flowchart showing a numeral analyzing process subroutine executed in S01 in FIG. 5.

In first S01 after the start, the CPU 12 executes a numeral analyzing process. FIG. 6 is a flowchart showing a numeral analyzing process subroutine executed in S01. In first S11 after entering this subroutine, the CPU 12 analyzes numerals constituting a connection request telephone number (telephone number requested to connect) contained in the call setting request received. Upon a completion of this analysis, the CPU 12 judges in nest S12 whether or not numerals or letters excluding 1–9 and "A"–"F" are contained in the connection request telephone number. Then, when the numerals or the letters excluding 1–9 and A–F are contained in the connection request telephone number, the CPU 12 makes a forced finish of the process on the assumption that the numerals of the connection request telephone number received are wrong. Whereas if the numerals or the letters excluding 1–9 and "A"–"F" are not contained in the connection request telephone number, the CPU 12 finishes this numeral analyzing process subroutine and returns the processing to a main routine in FIG. 5.

In the main routine in FIG. 5, the CPU 12 in S02 subsequent to S01 retrieves the telephone number management table 14 on the basis of the connection request telephone number. In next S03, the CPU 12 judges whether or not the connection request telephone number is registered in the telephone number management table 14. Then, if registered, the CPU 12 advances the processing to S04 and, if not registered, advances the processing to S07.

In S04, the CPU 12 judges whether a flag for indicating the existence or a flag for indicating non-existence is set in the connection request telephone number registered in the telephone number management table 14 (which corresponds to a non-existence judging unit). Then, if the flag for indicating the existence is set therein, the CPU 12 advances the processing to S05 in order to execute the call setting process with respect to the user terminal on the basis of this connection request telephone number.

By contrast, when judging in S04 that the flag for indicating the non-existence is set therein, the CPU 12 adds a dedicated access code (to be transferred when moved) to the call setting request received and transfers it to the SSP 4 (which corresponds to a transferring unit).

On the other hand, when judging that the connection request telephone number is not registered in the telephone number management table 14, the CPU 12 advances the processing to S07. In this S07, the CPU 12 retrieves the network number management table 16 on the basis of the connection request telephone number. In next S08, the CPU 12 judges whether or not the connection request telephone number is registered as a network number in the network number management table 16. Then, if registered, the CPU 12 advances the processing to S05 in order to execute the call setting process with respect to the user terminal on the basis of this connection request telephone number (the network number). Whereas if the connection request telephone number is not registered in the network number management table 16, the CPU 12 directly finishes this process.

[SSP]

Figure 7:
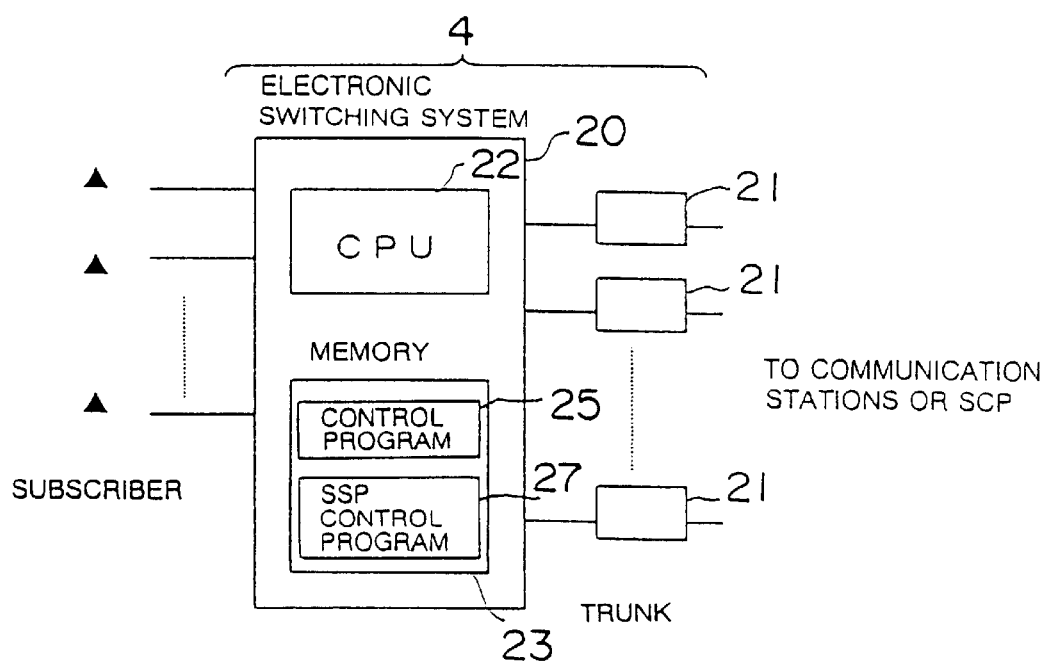
FIG. 7 is a block diagram illustrating a specific construction of an SSP in FIG. 2.

FIG. 7 is a block diagram illustrating a specific construction of the SSP (Service Switching Point) 4. As shown in FIG. 7, the SSP 4 is classified as a digital switch embracing the same constructive elements (the electronic switching system 20 and the multiplicity of trunks 21) as those in each of the local switches 2, 3. A difference of this SSP 4 from each of the local switches 2, 3 is that a memory 23 is stored with an SSP control program 27. This SSP control program 27, when the call setting request added with the above-described dedicated access code is transferred from each of the local switches 2, 3 (transferred when moved), transfers this call setting request to the SCP 5.

[SCP]

Figure 8:
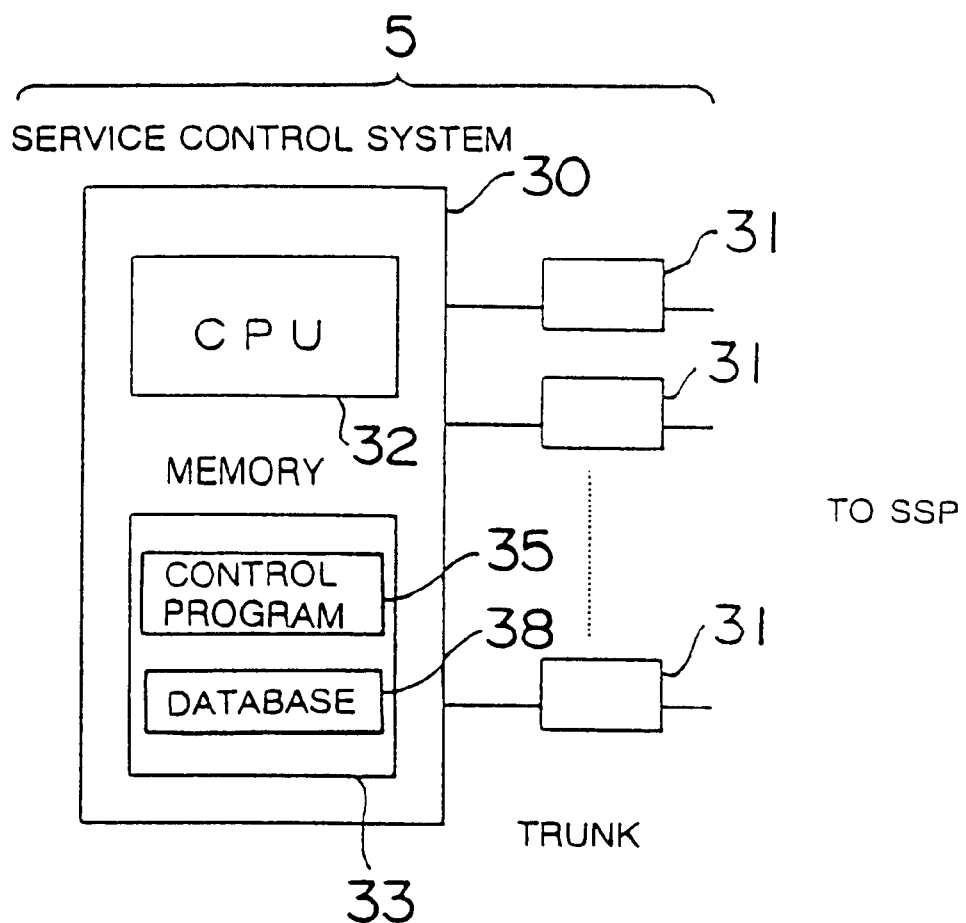
FIG. 8 is a block diagram illustrating a specific construction of an SCP in FIG. 2.

FIG. 8 is a block diagram illustrating a specific construction of the SCP (Service Control Point) 5. As shown in FIG. 8, the SCP 5 is classified as a communication equipment essentially consisting of a service control system 30 and a multiplicity of trunks 31 connected to this service control system 30. This SCP 5 is not a switch, and therefore the line of the subscriber terminal is not connected to the service control system. This service control system is constructed of a CPU 32 and a memory 33.

This CPU 32 is a processor for executing a number converting process of controlling the whole SCP 5 and of converting the connection request telephone number into a network number. The memory 33 is stored with a control program 35 for letting the CPU 32 perform required operations by this program 35 being executed by the CPU 12, and provides a working area for the control process by the CPU 1. Moreover, the memory 3 is stored with a conversion database 38 for executing the number converting process by actualizing the number portability function.

The conversion database 38 serving as a fourth table, as shown in FIG. 9, shows a list of corresponding relationships between the telephone numbers registered in the respective local switches 2, 3 and the network numbers allocated by other local switches 3, 2 with respect to the terminals to which the above telephone numbers are allocated. In the example in FIG. 9, a telephone number "25713514" registered in the local switch 2 of the common communications carrier X and a network number "E222D333" registered in the local switch of the common communications carrier Y, are registered in correspondence to each other with respect to the terminal 7 of the subscriber B.

Figure 10:
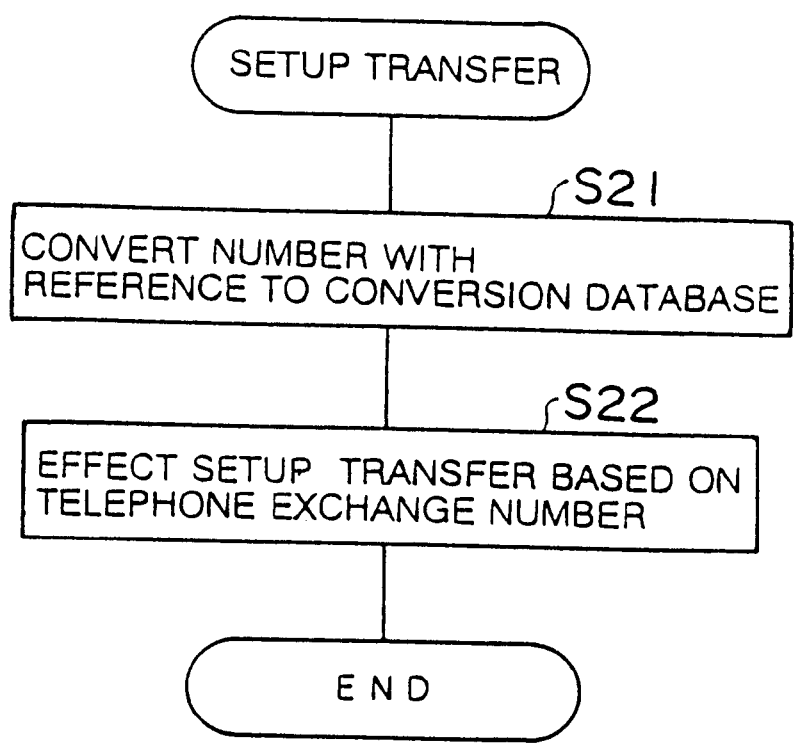
FIG. 10 is a flowchart showing a call setting request transferring process executed by the CPU in accordance with a control program in FIG. 8.

FIG. 10 is a flowchart showing a part of the control program 35 (a call setting request transfer process) to be executed by the CPU 32 with reference to the above conversion database 38. This call setting request transfer process starts upon receiving the call setting request to which the dedicated access code (transferred when moved) transferred from the SSP 4 is added.

In first S21 after the start, the CPU 32 retrieves the conversion database 38 on the basis of the connection request telephone number contained in the received call setting request, and reads a network number corresponding to this telephone number. Then, the CPU 32 overwrites the read network number onto the connection request telephone number in the call setting request (which corresponds to a converting unit).

In next S22, the same call setting request is transferred to a local switch specified by the telephone exchange number in the network number that is written as the connection request telephone number in the call setting request (which corresponds to a transferring unit).

(Operation in Call Setting)

Next, with reference to FIGS. 1 and 5, operations of the respective units within the telephone network will be explained by exemplifying a case where the terminal 6 of the subscriber A gives a call setting request to the terminal 7 of the subscriber B in the above-described telephone network.

Now, it is assumed that the subscriber "A" makes the terminal 6 off-hook and dials "2-5-7-1-3-5-1-4" (step 31). Thereupon, the local switch 1 of the common communications carrier A generates a call setting request containing a connection request telephone number "25713514" based on the hexadecimal number, and transmits it to the local switch (i.e., the local switch 2 of the common communications carrier X) identified by a telephone exchange number "2571" consisting of the first four digits of that connection request telephone number (step 32).

The local switch 2 receiving this call setting request judges with reference to the telephone number management table 14 that the connection request telephone number "25713514" contained in this call setting request is registered and that the terminal 7 of the subscriber B allocated with this telephone number does not, however, exist at present in the service area within the coverage by this local switch 2 (S03, S04). Then, this local switch 2 adds a dedicated access code (transferred when moved) to this call setting request and transfers the same request to the SSP 4 (S06) (step 33).

The SSP 4, to which this call setting request has been transferred, upon receiving this call setting request, recognizes from the dedicated access code added thereto that the terminal allocated with the connection request telephone number has moved. Then, the SSP 4 transfers this call setting request to the SCP 5 (step 34).

The SCP having received this call setting request refers to the conversion database 38 and recognizes that a network number "E222D222" is corresponded to the connection request telephone number "25713514" contained in the same call setting request. Then, the connection request telephone number "25713514" contained in this call setting request is overwritten with the network number "E222D222", thereby converting the number (S21) (step 35). Then, the call setting request is transferred to the local switch (i.e., the local switch 3 of the common communications carrier Y) having a telephone exchange number (a number portability number) "E222" consisting of the first four digits of the connection request telephone number (the network number) after being converted (S22) (step 36).

The local switch 2 having received the call setting request analyzes the numerals of the connection request telephone number (the network number) "E222D333" contained in this call setting request (S01) and, because of containing no inhibited letters excluding 1–9 and A–F, deals with this telephone number as a valid number.

Subsequently, the local switch 2, although it refers to the telephone number management table 14, judges that this connection request telephone number (the network number) "E222D333" is not registered (S03), and hence refers to the network number management table 16 and recognizes that this connection request telephone number (the network number) "E222D333" is registered (S09).

If the connection request telephone number (the network number) "E222D333" is thus registered, the terminal 7 of the subscriber B exists in the service target area within the coverage by the local switch 2, and therefore the local switch 2 executes a call setting process for establishing a call between this terminal 7 and the terminal 6.

As discussed above, in accordance with the embodiment 1, each local switching station is provided with the telephone exchange number "E222" for the number portability generally not opened to the public in addition to the telephone exchange number "2837" consisting of the first four digits of the ordinary telephone number. Therefore, a number, namely, the first four digits of which constitute the telephone exchange number "E222" for this number portability, can be allocated as a network number, and consequently it never happens that there is decreased the number of telephone numbers ($10^4$) which can be allocated as the ordinary telephone numbers. Besides, since B–F of the hexadecimal numbers are excluded out of the numerals inhibited from being used as the telephone numbers, B–F in addition to 1–9 and A used as the ordinary telephone numbers can be used as numerals of the second four digits (subscriber numbers) of the network numbers. Hence, the number of network numbers that can be allocated amounts up to $16^4$, and the number of the allocatable network numbers becomes well larger than in the prior art.

[Embodiment 2]

Figure 11:
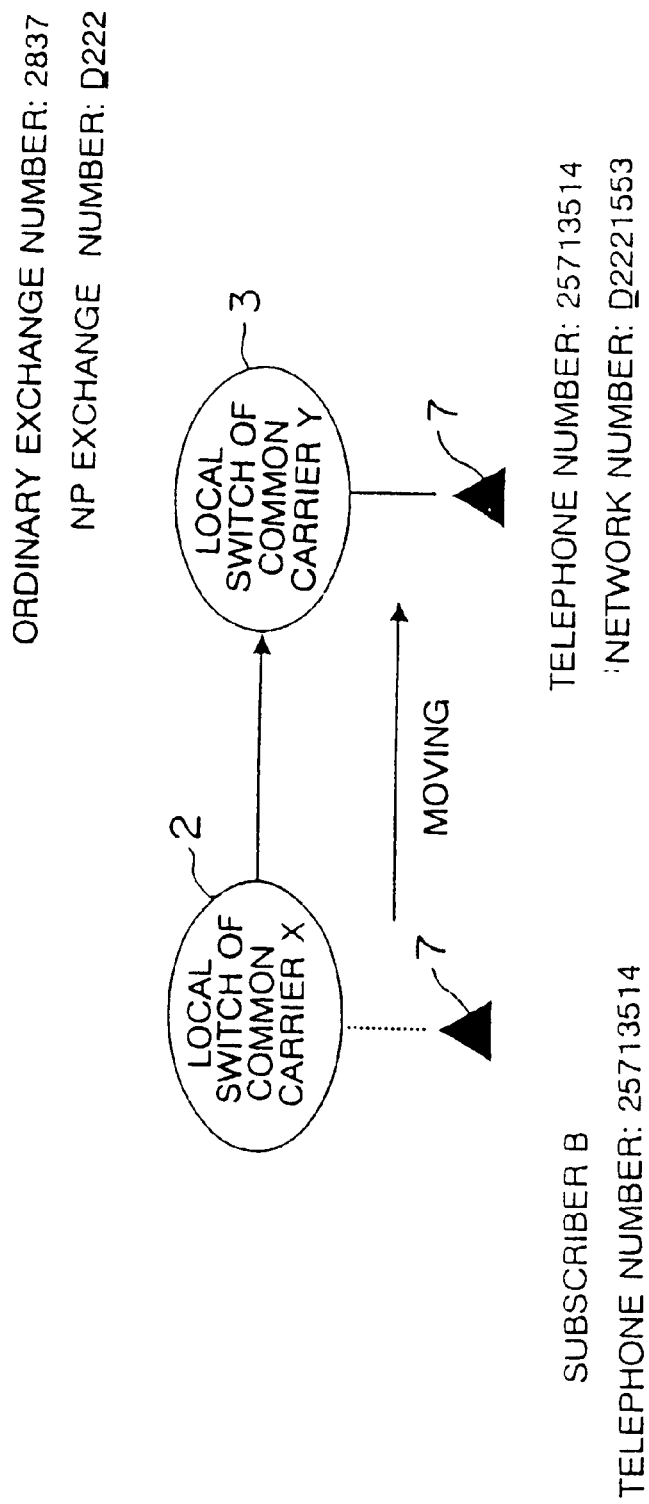
FIG. 11 is a diagram schematically showing a construction of a telephone network in a second embodiment of the present invention.
Figure 12:
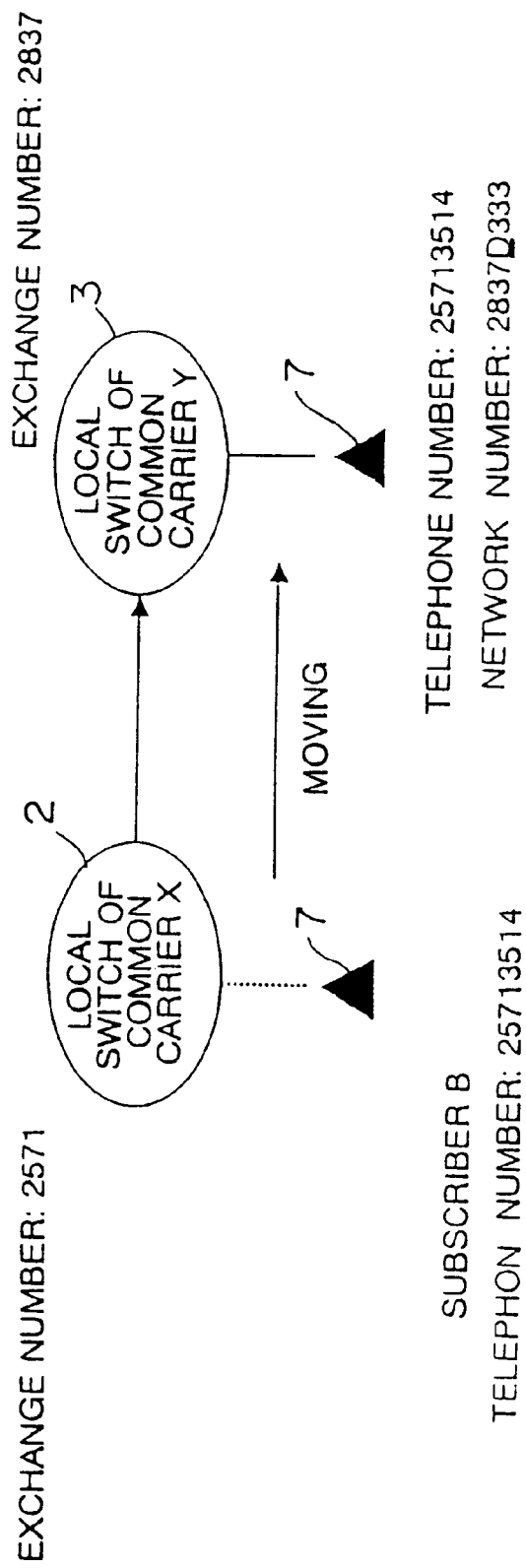
FIG. 12 is a diagram schematically showing a construction of the telephone network in a third embodiment of the present invention.

An embodiment 2 of the present invention is, as shown in a schematic explanatory diagram of FIG. 11, characterized by using only 1–9 and A applied to the ordinary telephone numbers as numerals of the second four digits (the subscriber numbers) of the network numbers in comparison with the first embodiment discussed above. If contrived in this way, the number of allocatable network numbers totals to $10^4$ at the maximum. As the embodiment 1 discussed above, however, each local switch 3 is provided with the number portability telephone exchange number "E222" generally not opened to the public in addition to the telephone exchange number "2837" consisting of the first four digits of the ordinary telephone number. It is therefore feasible to allocate, as a network number, the number the first four digits of which are the telephone exchange number "E222" for the number portability, and hence there is no possibility in which the number of telephone numbers ($10^4$) allocatable as the normal telephone numbers might be reduced. Other configurations in the embodiment 2 are absolutely the same as those in the embodiment 1, and hence the explanations thereof are omitted.

[Embodiment 3]

A characteristic point of an embodiment 3 of the present invention is that only the telephone exchange number "2837" consisting of the first four digits of the ordinary telephone number, is given as the telephone exchange number of each local switch 3 in comparison with the embodiment 1 discussed above. With this contrivance, although the number of allocatable network numbers decreases, B–F of the hexadecimal numbers are excluded out of the numerals inhibited from being used as the telephone numbers but always used for a part or the whole of the second four digits (the subscriber number) of the network number. Therefore, even if all the allocatable telephone numbers ($10^4$) are ensured for the ordinary telephone numbers, the number of allocatable network numbers totals ($16^4-10^4$). Other configurations in the embodiment 3 are absolutely the same as those in the embodiment 1, and hence the explanations thereof are omitted.

[Embodiment 4]

An embodiment 4 of the present invention is characterized such that the memory 13 of each of the local switches 2, 3 includes the conversion database 38 shown in FIG. 9, and the CPU 12 of each of the local switches 2, 3 executes a number converting process with respect to the telephone number of non-existence. Other configurations in each of the switches 1, 2 3 in the embodiment 4 are absolutely the same as those in the embodiment 1, and hence the explanations thereof are omitted.

Figure 14:
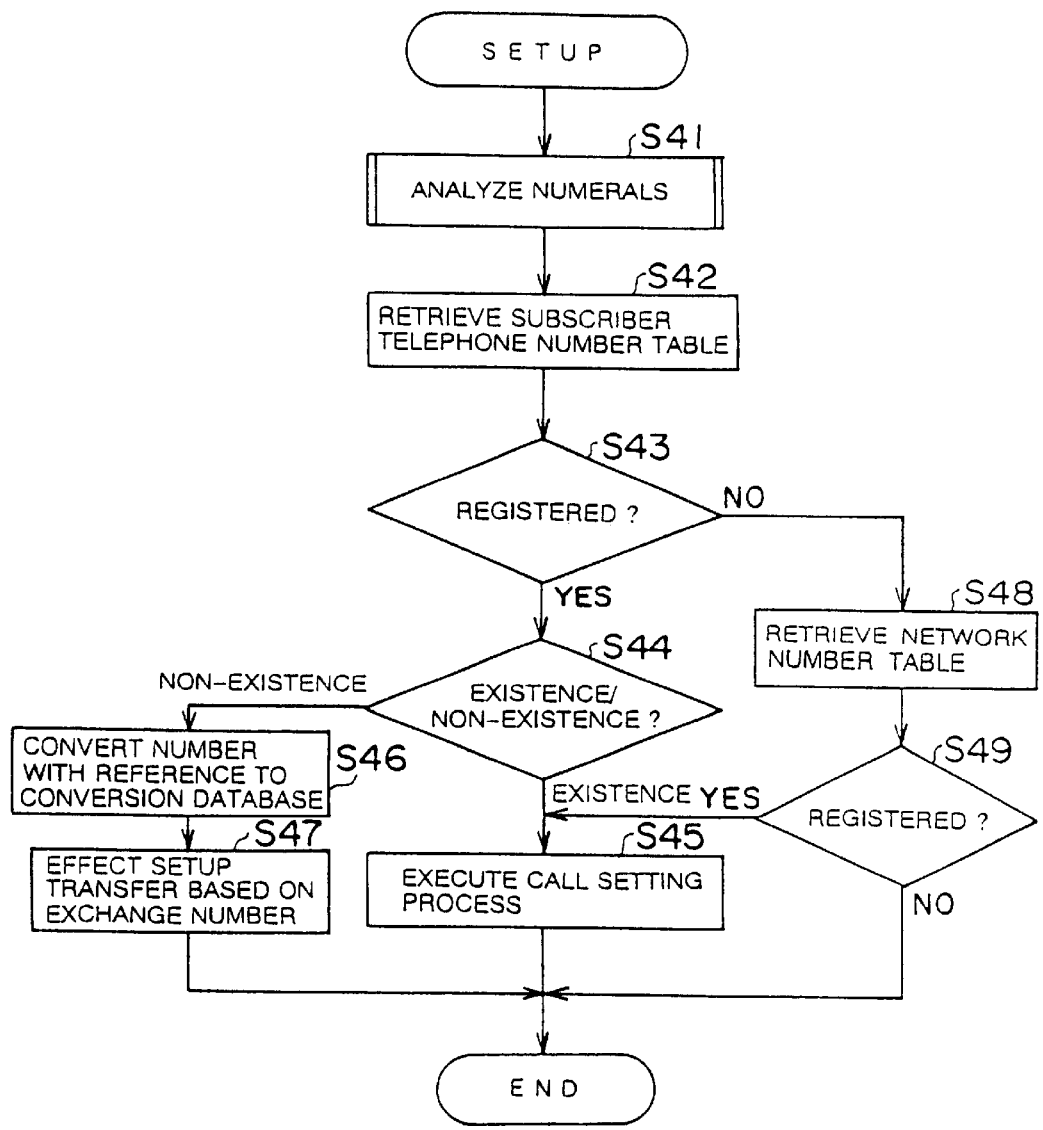
FIG. 14 is a flowchart showing the call setting process executed by the CPU of each local switch in FIG. 13.
Figure 15:
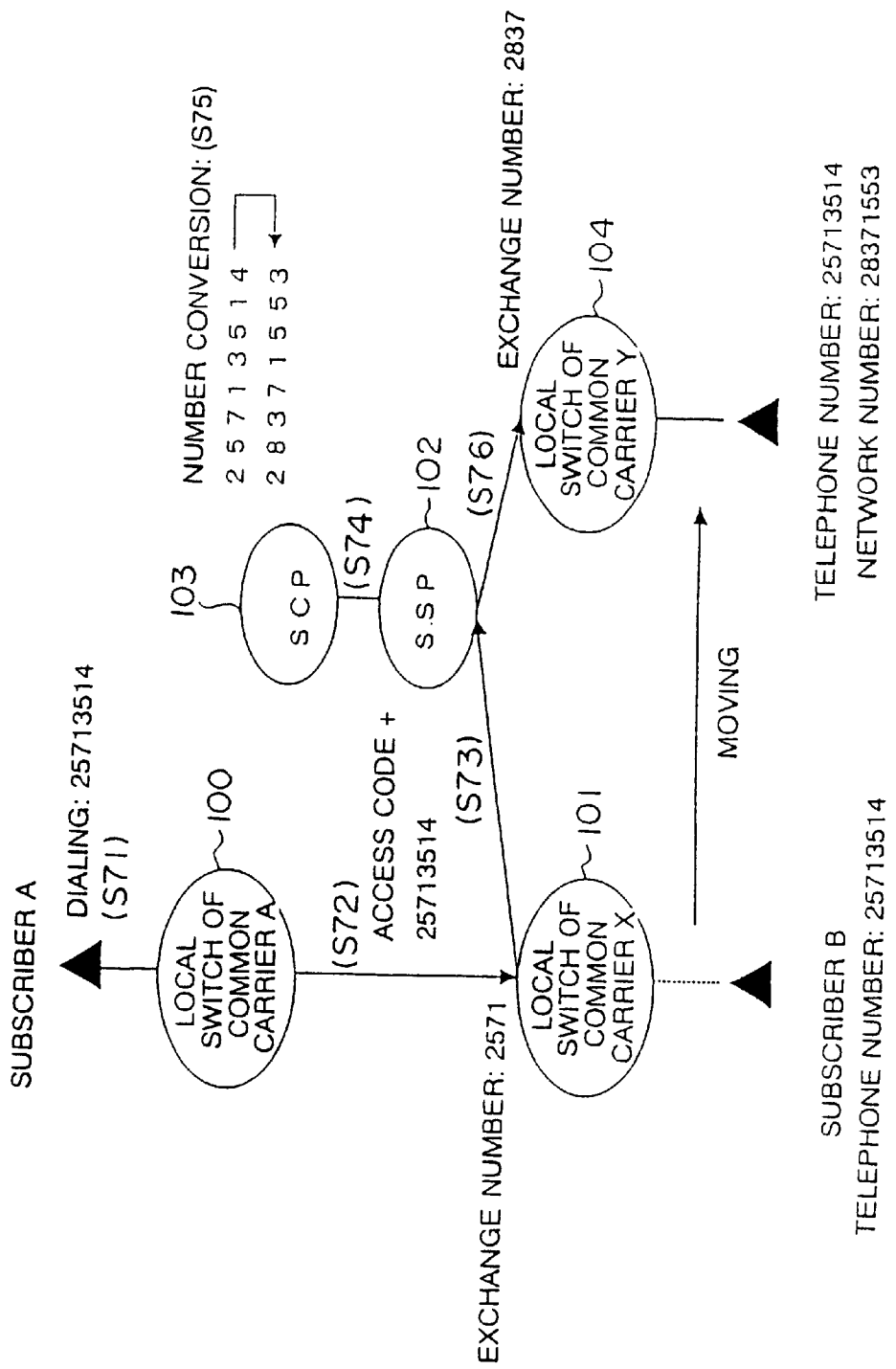
FIG. 15 is a diagram showing an example of roaming in the prior art.
Figure 16:
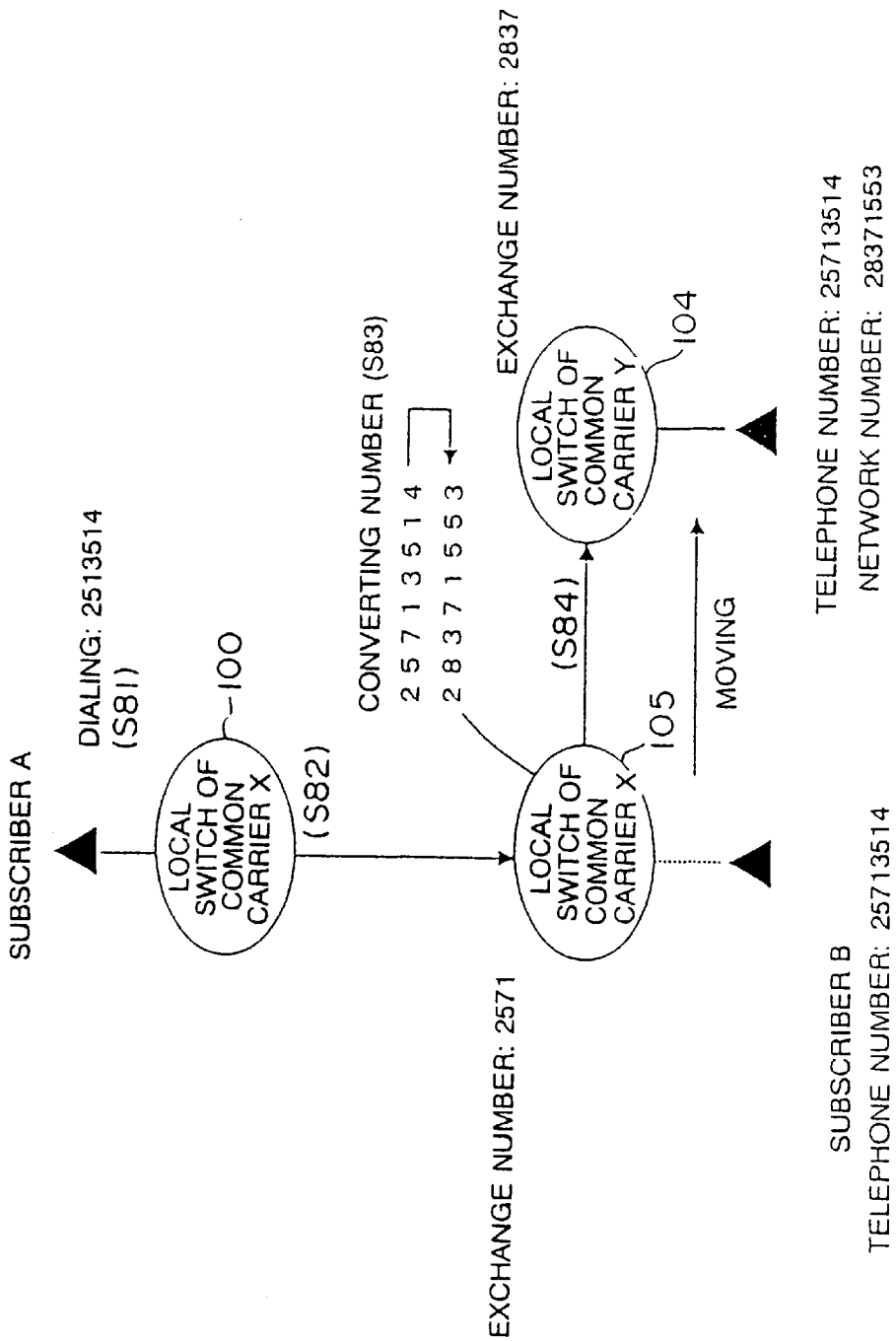
FIG. 16 is a diagram showing an example of roaming in the prior art.
Figure 17:
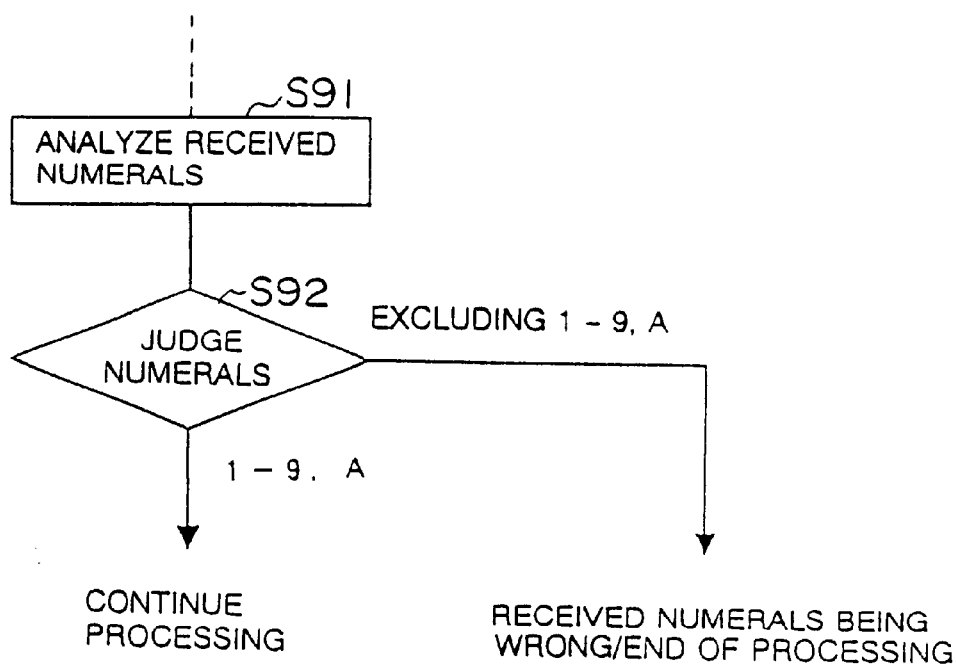
FIG. 17 is a flowchart showing a numeral analyzing process in a prior art switch.

FIG. 14 is a flowchart showing a part (a call setting/number converting process) of a control program 15 executed by the CPU 12 of each of the local switches 2, 3 in the embodiment 4. This call setting/number converting process starts upon receiving a call setting request from the subscriber terminal existing in the service area within the coverage of the local switch or from the local switch of other common communications carrier.

In first S41 after the start, the CPU 12 executes a numeral analyzing process in accordance with a numeral analyzing process subroutine shown in FIG. 6.

In next S42, the CPU 12 retrieves the telephone number management table 14 on the basis of the connection request telephone number. In next S43, the CPU 12 judges whether or not the connection request telephone number is registered in the telephone number management table 14. Then, if registered, the processing proceeds to S44. Whereas if not registered, the processing proceeds to S48.

In S44, the CPU 12 judges whether the flag for indicating the non-existence or the flag for indicating the existence is set in the connection request telephone number registered in the telephone number management table 14 (which corresponds to a non-existence judging unit). Then, if the flag for indicating the existence is set therein, the CPU 12 advances the processing to S45 in order to execute the call setting process with respect to the user terminal on the basis of this connection request telephone number.

By contrast, when judging in S44 that the flag for indicating the non-existence is set therein, the CPU 12 advances the processing to S46. In S46, the CPU 12 retrieves the conversion database 38 based on the connection request telephone number contained in the received call setting request, and reads a network number corresponding to this telephone number. Then, the CPU 12 overwrites the read network number onto the connection request telephone number in the call setting request (which corresponds to a converting unit).

In next S47, the call setting request is transferred toward the local switch specified by the telephone exchange number in the network number written as the connection request telephone number in the call setting request (which corresponds to a transferring unit).

On the other hand, in the case of judging in S43 that the connection request telephone number is not registered in the telephone number management table 14, the CPU 12 advances the processing to S48. In this S48, the CPU 12 retrieves the network number management table 16 based on the connection request telephone number. In next S49, the CPU 12 judges whether or not the connection request telephone number is registered as a network number in the network number management table 16. Then, if registered, the CPU 12 advances the processing to S45 in order to execute the call setting process with respect to the user terminal on the basis of this connection request telephone number (the network number). Whereas if the connection request telephone number is not registered in the network number management table 16, the CPU 12 directly finishes this process.

(Operation in Call Setting)

Figure 13:
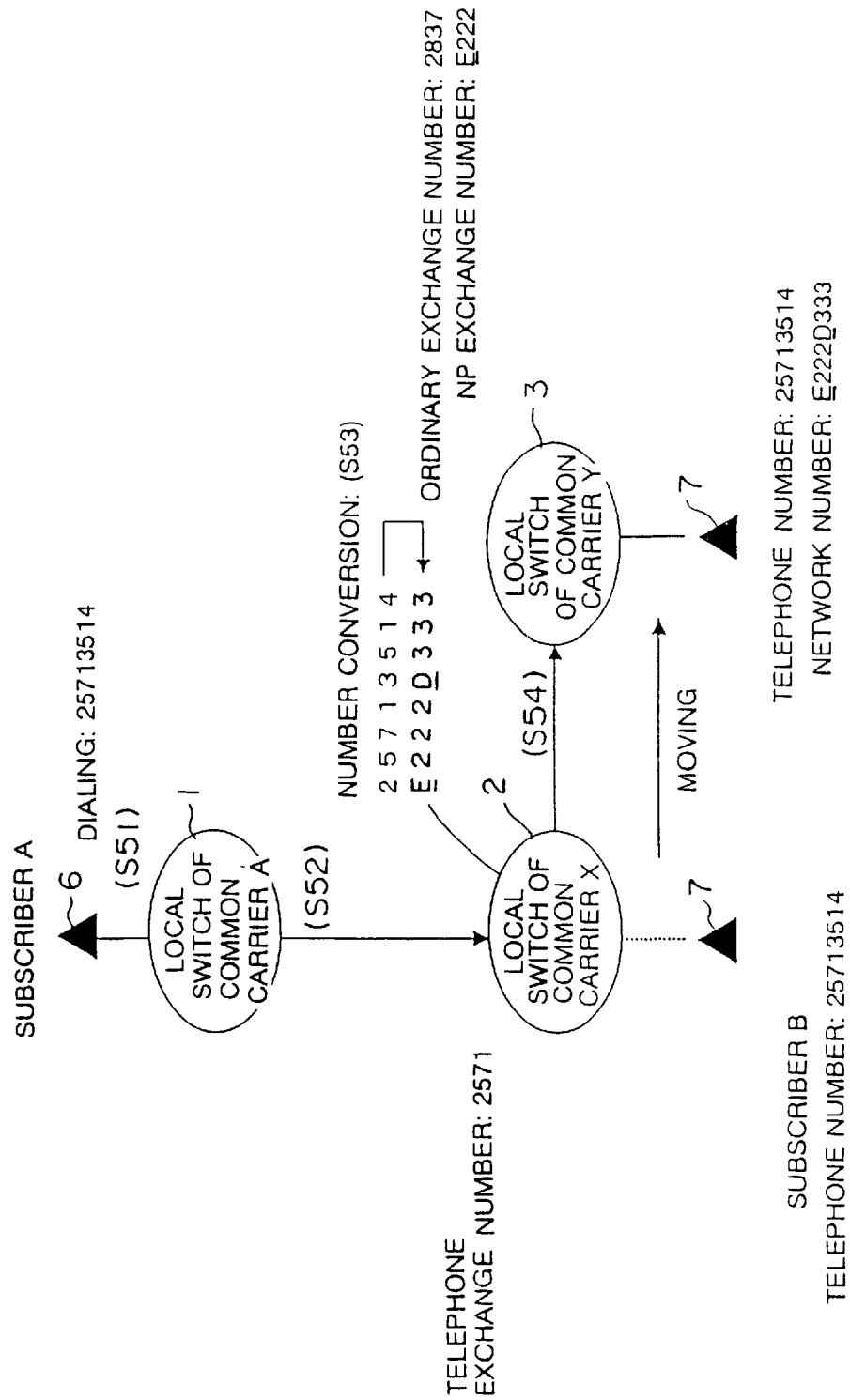
FIG. 13 is a diagram schematically showing a construction of the telephone network in a fourth embodiment of the present invention.

Next, with reference to FIG. 13 operations of the respective units within the telephone network will be explained by exemplifying a case where the terminal 6 of the subscriber A gives a call setting request to the terminal 7 of the subscriber B in the telephone network constructed above.

Now, it is assumed that the subscriber A makes the terminal 6 off-hook and dials "2-5-7-1-3-5-1-4" (step 51). Thereupon, the local switch 1 of the common communications carrier A generates a call setting request containing a connection request telephone number "25713514" based on the hexadecimal number, and transmits it to the local switch (i.e., the local switch 2 of the common communications carrier X) identified by a telephone exchange number "2571" consisting of the first four digits of that connection request telephone number (step 52).

The local switch 2 receiving this call setting request judges, with reference to the telephone number management table 14, that the connection request telephone number "25713514" contained in this call setting request is registered and that the terminal 7 of the subscriber B allocated with this telephone number does not, exist at present in the service area within the coverage by this local switch 2 (S43, S44). Then, this local switch 2 refers to the conversion database 38 and recognizes that the network number "E222D222" is corresponded to the connection request telephone number "25713514". Then, the connection request telephone number "25713514" contained in this call setting request is overwritten with the network number "E222D222", thereby converting the number (S46) (step 53). Then, the call setting request is sent toward the local switch (i.e., the local switch 3 of the common communications carrier Y) having a telephone exchange number (a number portability number) "E222" consisting of the first four digits of the connection request telephone number (the network number) after being converted (S47) (step 54).

The local switch 2 having received this call setting request analyzes the numerals of the connection request telephone number (the network number) "E222D333" contained in this call setting request (S41) and, because of containing no inhibited letters excluding 1–9 and A–F, deals with this telephone number as a valid number.

Subsequently, the local switch 2, although it refers to the telephone number management table 14, judges that this connection request telephone number (the network number) "E222D333" is not registered (S43), and hence refers to the network number management table 16 and recognizes that this connection request telephone number (the network number) "E222D333" is registered (S49).

If the connection request telephone number (the network number) "E222D333" is thus registered, the terminal 7 of the subscriber B exists in the service area within the coverage by the local switch 2, and therefore the local switch 2 executes a call setting process for establishing a call between this terminal 7 and the terminal 6.

As discussed above, in accordance with the embodiment 4, it is also feasible to obtain the same effect as that in the embodiment 1.

The network number management system and the switch according to the present invention, as described above, are constructed so that the number of the subscriber telephone numbers which can be registered in the switch is not reduced even if registering this switch with any number of network numbers.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A network number management system in a telephone network compromising a plurality of switches, each of said switches covering its own service area, and a telephone number converting apparatus;

each of said switches allocated with a first type of exchange number and a second type of exchange number which are peculiar to said switch, each of said switches including:
a first table registering a telephone number allocated to a terminal, the telephone number having a combination of the first type of exchange number and a subscriber number;
a second table registering non-existence information indicating whether or not the terminal allocated with the telephone number registered in said first table exists in the service area of said switch;
a third table registering a network number allocated to the terminal existing in the service area of the switch and having the telephone number registered in said first table of a different switch among said plurality of switches, the network number having a combination of the second type of exchange number and a subscriber number;
non-existence judging means, when there is a call setting request containing a connection requested telephone number registered in said first table of the switch, for judging whether or not the terminal allocated with the connection requested telephone number exists in the service area of said switch with reference to said second table; and
transferring means, when said non-existence judging means judges that the terminal does not exist in the service area of said switch, for transferring the call setting request to said telephone number converting apparatus; and said telephone number converting apparatus including:
  a fourth table in which the telephone number registered in said first table of one of said switches corresponds to the network number registered in said third table of another switch with respect to a same terminal;
  converting means, when receiving the call setting request transferred from one of said switches, for referring to said fourth table and for converting the connection requested telephone number of the call setting request into a corresponding network number; and
  transferring means for transferring the call setting connection request containing the connection requested telephone number converted by said converting means to a switch having a second type of exchange number contained in the connection requested telephone number after being converted,
  wherein the subscriber number contained in the telephone number registered in said first table includes only numerals of 1 through 9 and A based on a hexadecimal number, and
  wherein the subscriber number contained in the network number registered in said third table includes one of numerals of B through F based on the hexadecimal number.

2. A network number management system in a telephone network comprising a plurality of switches, each of said switches covering its own service area,
  each of said switches allocated with a first type of exchange number and a second type of exchange number which are peculiar to said switch, each of said switches including:
    a first table registering a telephone number allocated to a terminal, the telephone number having a combination of the first type of exchange number and a subscriber number;
    a second table registering non-existence information indicating whether or not the terminal allocated with the telephone number registered in said first table exists in the service area of said switch;
    a third table registering a network number allocated to the terminal existing in the service area of the switch and having the telephone number registered in said first table of a different switch among said plurality of switches, the network number having a combination of the second type of exchange number and a subscriber number;
    a fourth table in which the telephone number registered in said first table of said switch corresponds to the network number registered in said third table of another switch with respect to a same terminal;
    non-existence judging means, when there is a call setting request containing a connection requested telephone number registered in said first table, for judging whether or not the terminal allocated with the connection requested telephone number exists in the service area of said switch with reference to said second table;
    converting means, when said judging means judges that the terminal does not exist in the service area of said switch, for referring to said fourth table and for converting the connection requested telephone number of the call setting request into a corresponding network number; and
    transferring means, when said non-existence judging means judges that the terminal does not exist in the service area of said switch, for transferring the call setting request to a switch having a second type of exchange number contained in the connection requested telephone number after being converted,
  wherein the subscriber number contained in the telephone number registered in said first table includes only numerals of 1 through 9 and A based on a hexadecimal number, and
  wherein the subscriber number contained in the network number registered in said third table includes one of numerals of B through F based on the hexadecimal number.

3. A network number management system in a telephone network including a plurality of switches, each of said switches covering its own service area, and a telephone number converting apparatus:
  each of said switches allocated with an exchange number peculiar to said switch, each of said switches comprising:
    a first table registering a telephone number allocated to a terminal, the telephone number consisting of a combination of the exchange number and a subscriber number composed of only numerals of 1 through 9 and A based on a hexadecimal number;
    a second table registering non-existence information indicating whether or not the terminal allocated with the telephone number registered in said first table exists in the service area of said switch;
    a third table registering a network number allocated to the terminal existing in the service area of said switch and having the telephone number registered in said first table of a different switch among said plurality of switches, the network number consisting of a combination of the exchange number and a subscriber number containing one of numerals of B through F based on the hexadecimal number;
    non-existence judging means, when there is a call setting request containing a connection requested telephone number registered in said first table, for judging whether or not the terminal allocated with the connection requested telephone number exists in the service area of said switch with reference to said second table; and
    transferring means, when said non-existence judging means judges that the terminal does not exist in the service area of said switch, for transferring the call setting request to said telephone number converting apparatus; and
  said telephone number converting apparatus comprising:
    a fourth table in which the telephone number registered in said first table of one of said switches corresponds to the network number registered in said third table of another switch with respect to a same terminal;
    converting means, when receiving the call setting request transferred from one of said switches, for referring to said fourth table and for converting the connection requested telephone number of the call setting request into a corresponding network number; and
    transferring means for transferring the call setting connection request containing the connection requested telephone number converted by said converting means to a switch having an exchange number contained in the connection requested telephone number after being converted.

4. A network number management system in a telephone network comprising a plurality of switches, each of said switches covering its own service area;

each of said switches allocated with an exchange number peculiar to said switch, each of said switches comprising:

a first table registering a telephone number allocated to a terminal, the telephone number consisting of a combination of the exchange number and a subscriber number composed of numerals of 1 through 9 and A based on a hexadecimal number;

a second table registering non-existence information indicating whether or not the terminal allocated with the telephone number registered in said first table exists in the service area of said switch;

a third table registering a network number allocated to the terminal existing in the service area of said switch and having the telephone number registered in said first table of a different switch among said plurality of switches, the network number consisting of a combination of the exchange number and a subscriber number containing one of numerals of B through F based on the hexadecimal number;

a fourth table in which the telephone number registered in said first table of said switch corresponds to the network number registered in said third table of another switch with respect to a same terminal;

non-existence judging means, when there is a call setting request containing a connection requested telephone number registered in said first table, for judging whether or not the terminal allocated with the connection requested telephone number exists in the service area of said switch with reference to said second table;

converting means, when said judging means judges that the terminal does not exist in the service area of said switch, for referring to said fourth table and for converting the connection requested telephone number of the call setting request into a corresponding network number; and transferring means for transferring the call setting request containing the connection requested telephone number converted by said converting means to a switch having an exchange number contained in the connection requested telephone number after being converted.

5. A switch allocated with a first type of exchange number and a second type of exchange number which are peculiar to said switch, said switch comprising:

a first table registering a telephone number allocated to a terminal, the telephone number having a combination of the first type of exchange number and a subscriber number;

a second table registering non-existence information indicating whether or not the terminal allocated with the telephone number registered in said first table exists in the service area of said switch;

a third table registering a network number allocated to the terminal existing in the service area of said switch and having the telephone number registered in said first table of a different switch, the network number having a combination of the second type of exchange number and a subscriber number;

a fourth table in which the telephone number registered in said first table of said switch corresponds to the network number registered in said third table of another switch with respect to a same terminal;

non-existence judging means, when there is a call setting request containing a connection requested telephone number registered in said first table, for judging whether or not the terminal allocated with the connection requested telephone number exists in the service area of said switch with reference to said second table;

converting means, when said non-existence judging means judges that the terminal does not exist in the service area of said switch, for referring to said fourth table and for converting the connection requested telephone number of the call setting request into a corresponding network number; and transferring means for transferring the call setting connection request containing the connection requested telephone number converted by said converting means to a switch having an exchange number contained in the connection requested telephone number after being converted, wherein the subscriber number contained in the telephone number registered in said first table includes only numerals of 1 through 9 and A based on a hexadecimal number, and wherein the subscriber number contained in the network number registered in said third table includes one of numerals of B through F based on the hexadecimal number.

6. A switch allocated with an exchange number peculiar to said switch, said switch comprising:

a first table registering a telephone number allocated to a terminal, the telephone number consisting of a combination of the exchange number and a subscriber number composed of numerals of 1 through 9 and A based on a hexadecimal number;

a second table registering non-existence information indicating whether or not the terminal allocated with the telephone number registered in said first table exists in the service area of said switch;

a third table registering a network number allocated to the terminal existing in the service area of said switch and having the telephone number registered in said first table of a different switch, the network number consisting of a combination of the exchange number and a subscriber number containing one of the numerals of B through F based on the hexadecimal number;

a fourth table in which the telephone number registered in said first table of said switch corresponds to the network number registered in said third table of another switch with respect to a same terminal;

non-existence judging means, when there is a call setting request containing a connection requested telephone number registered in said first table, for judging whether or not the terminal allocated with the connection requested telephone number exists in the service area of said switch with reference to said second table;

converting means, when said judging means judges that the terminal does not exist in the service area of said switch, for referring to said fourth table and for converting the connection requested telephone number of the call setting request into a corresponding network number; and transferring means for transferring the call setting request containing the connection requested telephone number converted by said converting means, to a switch having an exchange number contained in the connection requested telephone number after being converted.

* * * * *